(12) United States Patent
Jagger et al.

(10) Patent No.: US 7,228,759 B2
(45) Date of Patent: Jun. 12, 2007

(54) ARRANGEMENT FOR PERMITTING MOTOR VEHICLE FOOT PEDAL RELEASE, AND MOTOR VEHICLE INCORPORATING SAME

(75) Inventors: Christopher Andrew Jagger, Wakefield (GB); Michael John Sharp, Scunthorpe (GB)

(73) Assignee: KSR Automotive Limited, Scunthorpe (GB)

( * ) Notice: Subject to any disclaimer, the term of this patent is extended or adjusted under 35 U.S.C. 154(b) by 498 days.

(21) Appl. No.: 10/838,738

(22) Filed: May 4, 2004

(65) Prior Publication Data

US 2004/0255714 A1 Dec. 23, 2004

(30) Foreign Application Priority Data

May 8, 2003 (GB) ................................. 0310510.3

(51) Int. Cl.
*G05G 1/14* (2006.01)
*B60K 28/10* (2006.01)

(52) U.S. Cl. .................... 74/512; 180/271; 180/274

(58) Field of Classification Search ................. 74/512, 74/513, 560; 180/271, 274; *G05G 1/14*
See application file for complete search history.

(56) References Cited

U.S. PATENT DOCUMENTS 5,848,558 A * 12/1998 Isono et al. .................... 74/512
5,996,439 A    12/1999 Elton et al.
6,076,422 A *  6/2000 Tabata ........................... 74/512
6,209,416 B1 * 4/2001 Tiemann et al. ............... 74/512
6,499,376 B2 * 12/2002 Thistleton et al. ............ 74/512
6,571,900 B2 *  6/2003 Thistleton .................... 180/274
2004/0020324 A1 * 2/2004 Jemmeson et al. ............ 74/512
2005/0050980 A1 * 3/2005 Park ............................ 74/512
2005/0229738 A1 * 10/2005 Podkopayev ................. 74/512

FOREIGN PATENT DOCUMENTS

| EP | 0 827 885 A1 | 3/1998 |
| EP | 1 074 445 A2 | 2/2001 |
| EP | 1 247 710 A1 * | 10/2002 |
| WO | WO 2004/026650 A1 | 4/2004 |
| WO | WO 2005/049389 A1 * | 6/2005 |

\* cited by examiner

*Primary Examiner*—Vinh T. Luong
(74) *Attorney, Agent, or Firm*—Gifford, Krass, Sprinkle, Anderson & Citkowski, P.C.

(57) ABSTRACT

Apparatus (1) for permitting release of a motor vehicle foot pedal, in a frontal crash, having a primary pedal arm (12) carrying a foot pad (14) and a secondary pedal arm (2) linked to the primary pedal arm (12) and provided at its lower end an open aperture (5) to receive a portion of a linkage pin (17). A trigger lever (6) is mounted on the secondary pedal arm (15) to be struck in a crash situation, and displaced, by a non-deformable portion (20) of a motor vehicle. The trigger lever (6) is provided at its other end with an open aperture (10) also to receive the linkage pin (17) and, in normal operation of the arrangement, to captivate the linkage pin (17) within the open aperture (5). A shearable rivet (7) connects the trigger lever (6) and the secondary pedal arm (2), restraining displacement of the trigger lever (6) with respect to the secondary pedal arm (2) so as to retain captivation of the linkage pin (17) until a crash occurs.

8 Claims, 4 Drawing Sheets

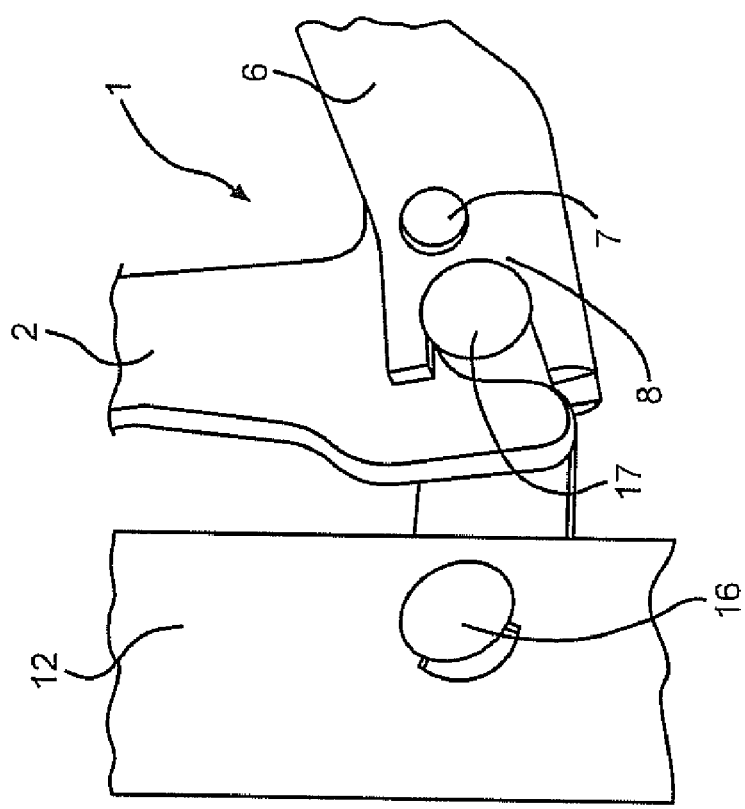
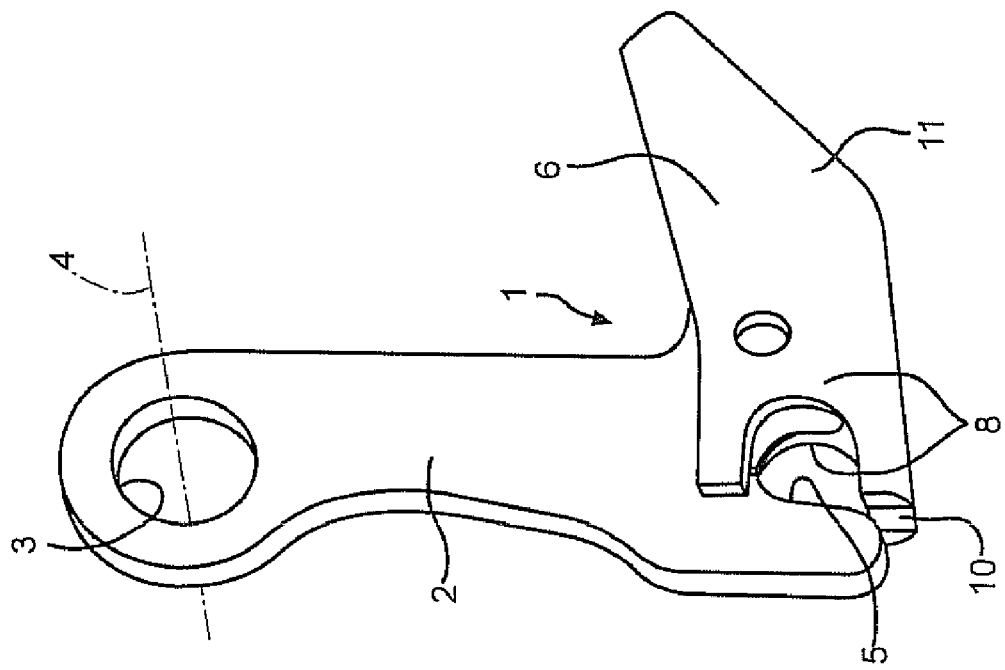

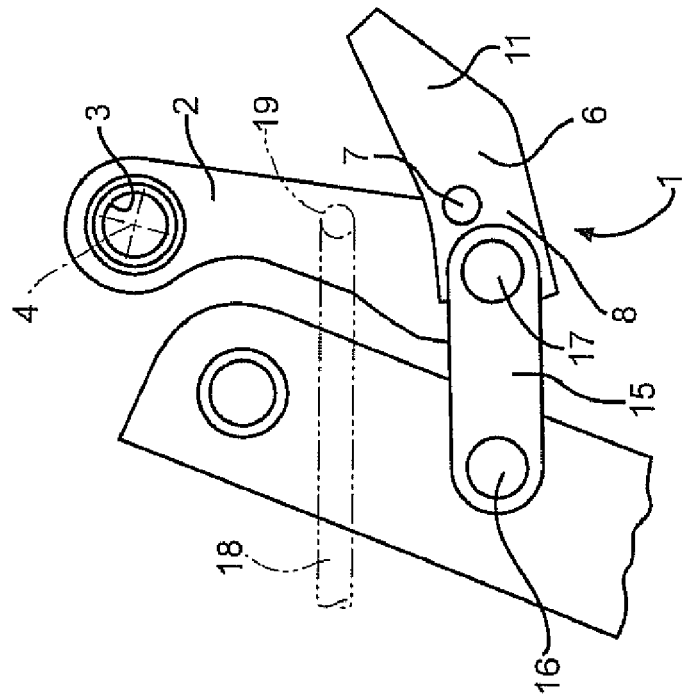
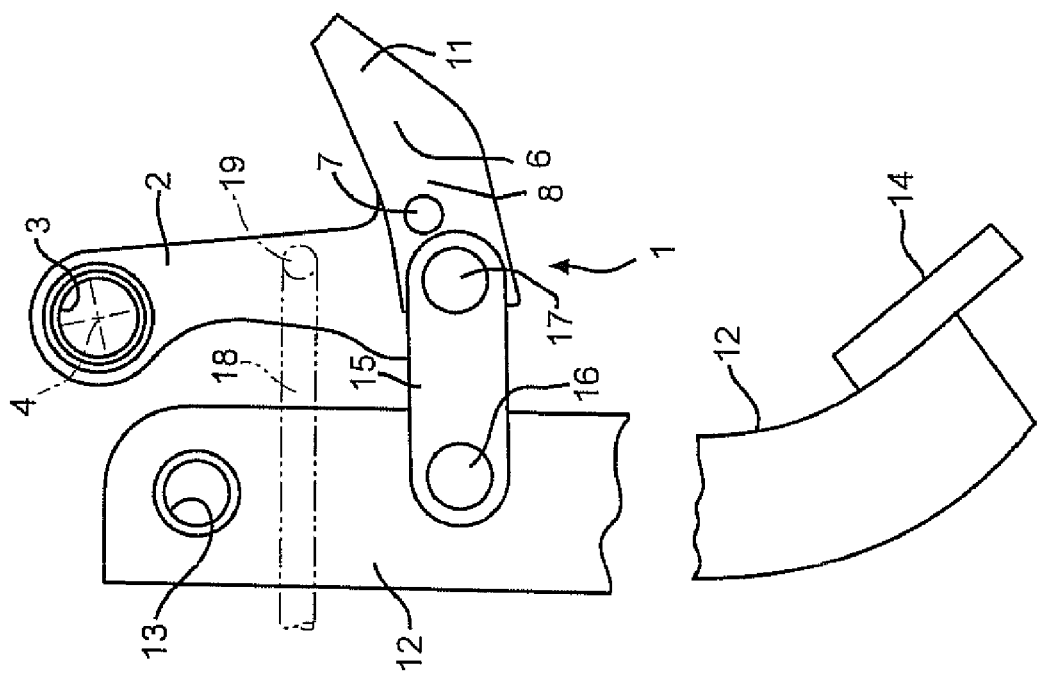
FIG. 3A
FIG. 3B

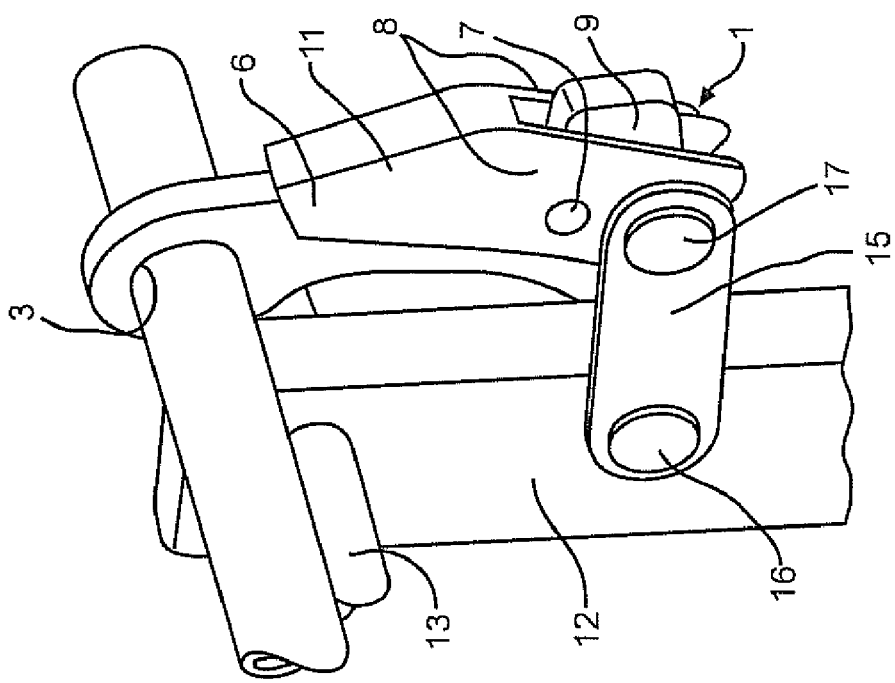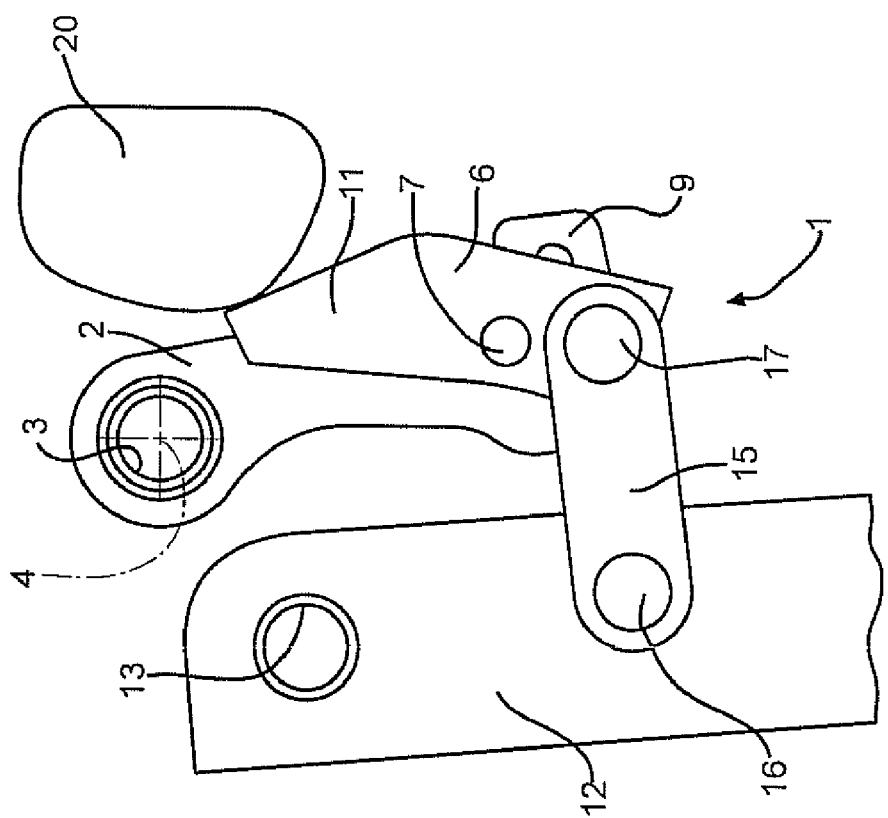

ARRANGEMENT FOR PERMITTING MOTOR VEHICLE FOOT PEDAL RELEASE, AND MOTOR VEHICLE INCORPORATING SAME

FIELD OF THE INVENTION

This invention relates in a first aspect to an arrangement for permitting release of the foot pedal of a motor vehicle to minimize, if not eliminate lower leg and/or foot injuries in a crash situation of sufficient magnitude, and whilst the device would normally be effective on the brake pedal, the principles described could be applied to any other pedals (clutch pedal and the accelerator pedal), and in a second aspect to a motor vehicle incorporating such an arrangement.

BACKGROUND OF THE INVENTION

The prior art is replete with proposals for disconnecting, or otherwise rendering ineffective, the connection of a push rod eg of a brake booster, to a brake pedal, such that in a frontal crash of sufficient magnitude, the pedal is no longer a rigid obstruction capable of injuring or trapping a driver's lower legs or feet.

OBJECT OF THE INVENTION

A basic object of the invention is the provision of an improved arrangement for producing crash induced release of a motor vehicle foot pedal, and a motor vehicle incorporating same.

SUMMARY OF A FIRST ASPECT OF THE INVENTION

According to a first aspect of the present invention there is provided an arrangement for permitting release of a motor vehicle foot pedal, in a frontal crash of sufficient magnitude, comprising:
(i) a primary pedal arm adapted to be mounted adjacent its upper end on a first pivot pin and adapted to carry a foot pad at its lower end;
(ii) a secondary pedal arm adapted to be mounted adjacent its upper end on a second pivot pin spaced from the first pivot pin, and providing, at its lower end an open aperture;
(iii) a linkage connecting the primary pedal arm to the secondary pedal arm during normal operation of the motor vehicle foot pedal, the linkage including a linkage pin receivable in the open aperture of the second pedal arm;
(iv) a trigger lever mounted on the secondary pedal arm and provided at one end with an abutment surface adapted, when the arrangement is installed in a motor vehicle and when in a frontal crash situation of sufficient magnitude, to be struck and displaced by a portion of a motor vehicle designed not to deform, and provided at its other end with an open aperture also to receive the linkage pin and, in normal operation of the arrangement, to captivate the linkage pin within the open aperture of the secondary pedal arm; and
(v) a connection between the trigger lever and the secondary pedal arm that, in normal operation, restrains movement of the trigger lever with respect the secondary pedal arm so as to retain captivation of the linkage pin, and that is also capable of being sheared or fractured in a frontal crash situation of sufficient magnitude upon application of a sufficient force on the abutment surface of the trigger lever to cause such shear or fracture, whereupon the struck trigger arm is displaced to a non-captivating position in which the linkage pin is free to exit the open aperture of the secondary pedal arm, thereby disconnecting the primary pedal arm from the secondary pedal arm, to cause release of the primary pedal arm.

SUMMARY OF A SECOND ASPECT OF THE INVENTION

According to a second aspect of the invention, there is provided a motor vehicle comprising an arrangement in accordance with the first aspect.

Preferred of Optional Features

The open aperture of the secondary pedal arm is "C"-shaped.

The open aperture of the secondary pedal arm is "U"-shaped.

The open aperture of the trigger lever is "C"-shaped.

The open aperture of the trigger lever is "U"-shaped.

The trigger lever is mounted on the secondary pedal arm via a shearable rivet.

The linkage pin is provided at one end of a link pivotally attached at its other end to the primary pedal arm.

The link comprises a pair of arms, one located to each opposite side of the primary pedal arm and mounted on a common pivot pin passing through the primary pedal arm, whilst the linkage pin bridges the other end of the link arms.

The pivot pins of both the primary and secondary pedal arms have parallel axes the secondary pedal arm effecting swinging movements with the primary pedal arm during normal operation of the motor vehicle foot pedal.

BRIEF DESCRIPTION OF THE DRAWING

One embodiment of arrangement in accordance with the invention is described, as follows, with reference to the accompanying drawings, in which:

FIG. 1 is a side, perspective view of an arrangement in accordance with the invention, illustrates the principle of the invention by showing, for clarity, only the secondary pedal arm and the trigger lever;

FIG. 2 corresponds to FIG. 1, but has additional components;

FIG. 3A is a side elevation of the arrangement, showing the arrangement of FIGS. 1 and 2 with yet further components added, in a "rest" position during normal operation;

FIG. 3B corresponds to FIG. 3A, but shows the arrangement in a stroked position during normal operation;

FIG. 4 corresponds to FIGS. 3A and 3B, but shows the arrangement in a crash situation of sufficient magnitude;

FIG. 5 is a side, perspective view of the arrangement in the FIG. 4 position;

DETAILED DESCRIPTION OF THE DRAWINGS

Figure 7:
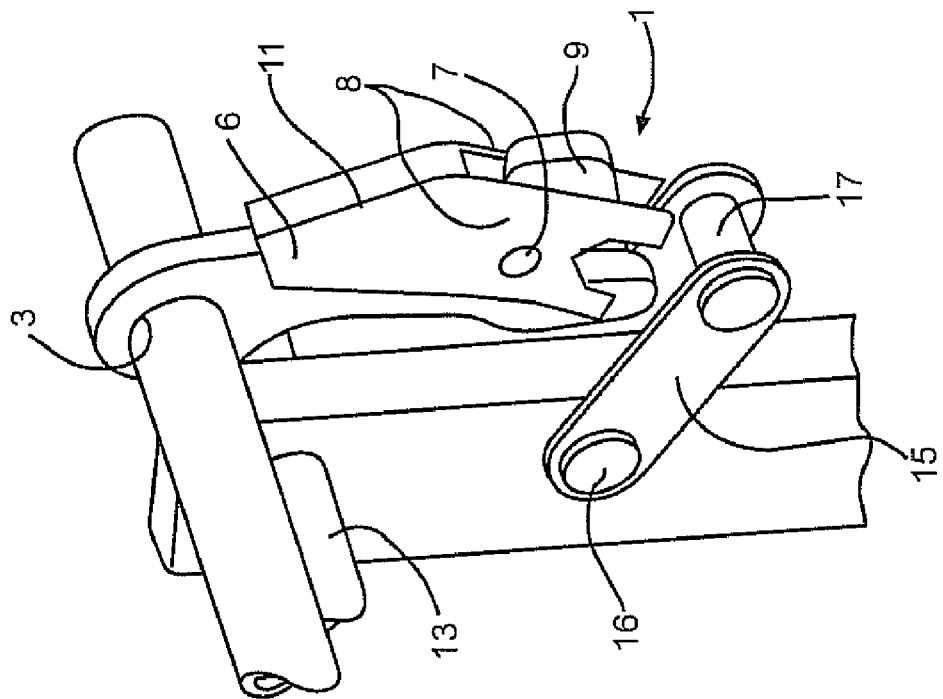
FIG. 7 corresponds to FIG. 6, but is a side perspective view.

In all Figures is illustrated an arrangement 1 for permitting release of a motor vehicle foot pedal, in a frontal crash situation of sufficient magnitude, with FIG. 1 illustrating the principle of the invention, in which a secondary pedal arm 2, stamped from plate metal, is provided at its upper end with a through hole 3 for mounting on a pivot axis 4. At its lower end, the secondary pedal arm 2 is provided with an open aperture 5 of "C" or "U"-shape.

A trigger lever 6 is mounted on the secondary pedal arm by a shear rivet 7. The lever 6 is folded to "U"-shape from sheet metal so as to have two spaced apart side cheeks 8 to receive, between them, a portion 9 of the lower end of the secondary pedal arm, with one end of the trigger lever also providing an open "C" or "U"-shaped aperture 10 disposed, in normal operation, at approximately 90° to the aperture 5 so as to close off the aperture 5 as best illustrated in FIGS. 1 and 2. Finally, the trigger lever 6 is provided with an abutment surface 11 adapted, in a frontal crash situation of sufficient magnitude, to be struck by a portion of the vehicle designed not to deform, to shear the rivet 7 and to displace the trigger lever 6 to the position best illustrated in FIGS. 6 and 7 where the aperture 5 has become exposed.

As illustrated in one or more of FIGS. 2, 3A and 3B, a primary pedal arm 12 is adapted to be mounted adjacent its upper end on a pivot pin 13 having an axis parallel to, but spaced from, the axis 4 of the secondary pedal arm 2, whilst at its lower end, the primary pedal arm 11 carries a foot pad 14.

The primary and secondary arms 12 and 2 are connected by a linkage comprising a pair of links 15 pivotally attached at one end to the primary pedal arm 12 on a common pivot pin 16, and carrying at their other end a common linkage pin 17 adapted, as best illustrated in FIG. 2, to be captivated in the aperture 5 by the trigger lever 6 during normal operation of the arrangement 1, ie in a non-crash situation.

Thus swinging movements of the primary pedal arm 12 by the use of the driver's foot (not shown) and return movements by a return spring (not shown) are transmitted via the links 15 etc to the secondary pedal arm 2.

As illustrated in FIGS. 3A and 3B, a push rod 18 eg of a brake booster or of a clutch, is pivotally connected at 19 to the secondary pedal arm 2.

Figure 6:
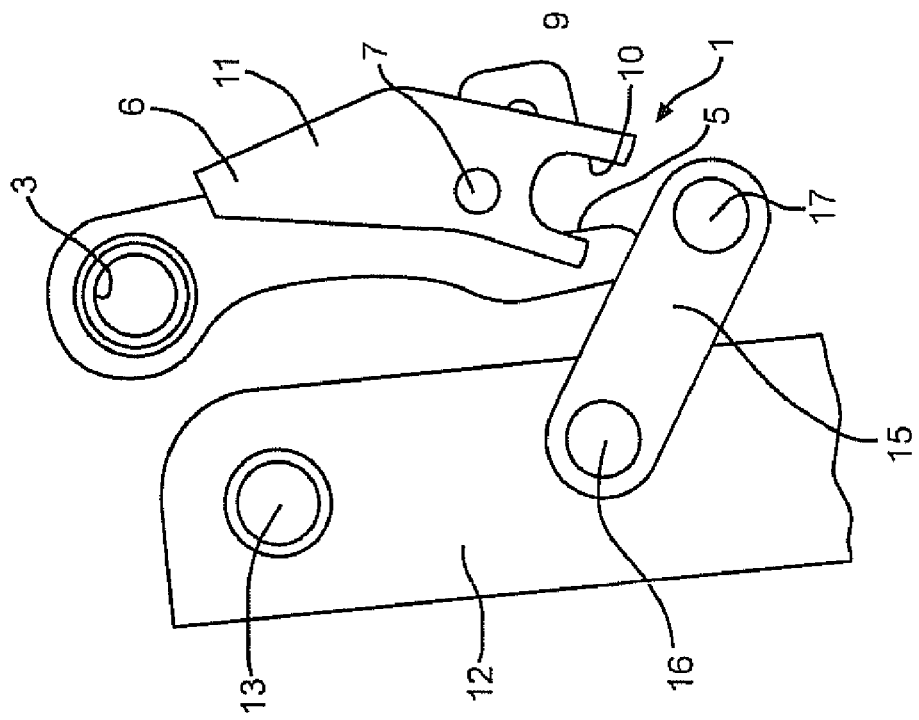
FIG. 6 is a side elevation corresponds to FIG. 4, but showing the linkage pin having exited the open aperture of the secondary pedal arm thereby unfastening the linkage connection between the primary and secondary pedal arms.

A frontal crash situation of sufficient magnitude is illustrated in FIGS. 4–7 where a cross beam 20 (or other standard vehicle component designed not to deform) whilst normally spaced from the trigger lever 6 in normal operation, strikes the trigger level 6 as a result of relative movement, to shear the rivet 7, so that the open aperture 10 of the trigger lever 6 is no longer retained at 90° with respect to the open aperture 5 of the secondary pedal arm 2 so as to captivate the linkage pin 17 within the aperture 5, but is displaced to the position best illustrated in FIGS. 6 and 7 to unfasten the linkage connection 15, 16, 17 between the primary and secondary pedal arms 11 and 2. The primary pedal arm 12 is then free to swing about its pivot pin 13 and can no longer damage, or trap, a driver's foot or lower limb(s) in a crash situation.

The invention claimed is:

1. Apparatus for releasing a motor vehicle foot pedal, in a frontal crash, said apparatus comprising in combination:
   (i) a primary pedal arm adapted to be mounted adjacent an upper end on a first pivot pin and adapted to carry a foot pad at a lower end;
   (ii) a secondary pedal arm adapted to be mounted adjacent an upper end of said secondary pedal arm on a second pivot pin spaced from said first pivot pin, and providing, at a lower end of said secondary pedal arm an open aperture;
   (iii) a linkage connecting said primary pedal arm to said secondary pedal arm during normal operation of said motor vehicle foot pedal, said linkage including a linkage pin receivable in said open aperture of said secondary pedal arm;
   (iv) a trigger lever mounted on said secondary pedal arm and provided at one end with an abutment surface adapted, when said arrangement is installed in a motor vehicle and when in a frontal crash situation, to be struck and displaced by a non-deformed portion of said motor vehicle, and provided at another end with an open aperture also to receive said linkage pin and, in normal operation of said arrangement, to captivate said linkage pin within said open aperture of said secondary pedal arm; and
   (v) a connection between said trigger lever and said secondary pedal arm that, in normal operation, restrains movement of said trigger lever with respect to said secondary pedal arm so as to retain captivation of said linkage pin, said connection being shearable in a frontal crash situation upon application of a force on said abutment surface of said trigger lever to cause shearing of said connection, whereby said struck trigger lever is displaced to a non-captivating position in which said linkage pin is free to exit said open aperture of said secondary pedal arm, thereby disconnecting said primary pedal arm from said secondary pedal arm and causing release of said primary pedal arm.

2. Apparatus as claimed in claim 1, wherein said open aperture of said secondary pedal arm is "C"-shaped, or "U"-shaped.

3. Apparatus as claimed in claim 1, wherein said open aperture of said trigger lever is "C"-shaped, or "U"-shaped.

4. Apparatus as claimed in claim 1, wherein said trigger lever is mounted on said secondary pedal arm via a shearable rivet, wherein said connector comprises said shearable rivet and wherein said trigger lever connects said secondary pedal arm and is mounted on said secondary pedal arm via said shearable rivet.

5. Apparatus as claimed in claim 1, and further comprising a link pivotally attached at an end to said linkage pin and at another end to said primary pedal arm.

6. Apparatus as claimed in claim 5, wherein said link comprises a pair of arms, one located to each opposite side of said primary pedal arm and further comprises a common pivot pin passing through said pair of arms and said primary pedal arm, said linkage pin bridging the other end of said arms of said link.

7. Apparatus as claimed in claim 1, wherein said pivot pins of each of said primary and secondary pedal arms have parallel axes, said secondary pedal arm effecting Swinging movements with said primary pedal arm during normal operation of said motor vehicle foot pedal.

8. A motor vehicle having a non-deformable portion and further comprising apparatus for permitting release of a motor vehicle foot pedal, in a frontal crash, said apparatus comprising:
   (i) a primary pedal arm adapted to be mounted adjacent an upper end on a first pivot pin and adapted to carry a foot pad at a lower end;
   (ii) a secondary pedal arm adapted to be mounted adjacent an upper end of said secondary pedal arm on a second pivot pin spaced from said first pivot pin, and providing, at a lower end of said secondary pedal arm an open aperture;

(iii) a linkage connecting said primary pedal arm to said secondary pedal arm during normal operation of said motor vehicle foot pedal, said linkage including a linkage pin receivable in said open aperture of said secondary pedal arm;

(iv) a trigger lever mounted on said secondary pedal arm and provided at one end with an abutment surface adapted, when said arrangement is installed in a motor vehicle and when in a frontal crash situation, to be struck and displaced by said non-deformable portion of said motor vehicle, and provided at its other end with an open aperture also to receive said linkage pin and, in normal operation of said arrangement, to captivate said linkage pin within said open aperture of said secondary pedal arm; and (v) a connection between said trigger lever and said secondary pedal arm that, in normal operation, restrains movement of said trigger lever with respect to said secondary pedal arm so as to retain captivation of said linkage pin, said connection being shearable in a frontal crash situation upon application of a force on said abutment surface of said trigger lever to cause shearing of said connection, whereby said struck trigger lever is displaced to a non-captivating position in which said linkage pin is free to exit said open aperture of said secondary pedal arm, thereby disconnecting said primary pedal arm from said secondary pedal arm, and causing release of said primary pedal arm.

* * * * *